(12) United States Patent
Koch et al.

(10) Patent No.: US 11,530,754 B2
(45) Date of Patent: Dec. 20, 2022

(54) SEALING DIAPHRAGM AND CHECK VALVE HAVING A SEALING DIAPHRAGM FOR FLUID TECHNOLOGY APPLICATIONS

(71) Applicant: Aventics GmbH, Laatzen (DE)

(72) Inventors: Jens Koch, Hannover (DE); Carsten Ammann, Burgdorf (DE); Martin Stolper, Bad Zwischenahn (DE)

(73) Assignee: Aventics GmbH, Laatzen (DE)

( * ) Notice: Subject to any disclaimer, the term of this patent is extended or adjusted under 35 U.S.C. 154(b) by 0 days.

(21) Appl. No.: 17/416,817

(22) PCT Filed: Dec. 2, 2019

(86) PCT No.: PCT/DE2019/000309
§ 371 (c)(1),
(2) Date: Jun. 21, 2021

(87) PCT Pub. No.: WO2020/125831
PCT Pub. Date: Jun. 25, 2020

(65) Prior Publication Data
US 2022/0049782 A1 Feb. 17, 2022

(30) Foreign Application Priority Data

Dec. 21, 2018 (DE) ..................... 10 2018 009 963.7

(51) Int. Cl.
*F16K 15/14* (2006.01)
(52) U.S. Cl.
CPC ....... *F16K 15/148* (2013.01); *Y10T 137/7879* (2015.04)
(58) Field of Classification Search
CPC .... F16K 15/142; F16K 15/145; F16K 15/148; Y10T 137/7879; Y10T 137/7896

(Continued)

(56) References Cited

U.S. PATENT DOCUMENTS

| 2,208,188 | A | * | 7/1940 | Johnston | ............... F16K 15/148 137/516.23 |
| 3,354,903 | A | * | 11/1967 | Caruso | .................. F16K 15/148 137/512.15 |
| 4,781,674 | A | * | 11/1988 | Redmond | ........... A61M 27/006 137/854 |
| 5,121,840 | A | * | 6/1992 | Schram | ................. F16K 15/144 206/522 |

(Continued)

FOREIGN PATENT DOCUMENTS

| DE | 1 173 298 B | 7/1964 |
| DE | 72 19 252 U | 5/1972 |

(Continued)

OTHER PUBLICATIONS

International Search Report corresponding to PCT Application No. PCT/DE2019/000309, dated Apr. 2, 2020 (German and English language document) (5 pages).

*Primary Examiner* — Kevin F Murphy
(74) *Attorney, Agent, or Firm* — Maginot, Moore & Beck LLP

(57) ABSTRACT

The disclosure relates to a sealing diaphragm and a check valve comprising a sealing diaphragm for fluid technology applications. A sealing diaphragm for fluid technology applications is to be provided, which is economical and constructionally simple to produce, which can be used as a closing means for a check valve and with which unwanted interfering noise can be prevented during operation. The object of the disclosure is achieved by a sealing diaphragm with a flat, flexible sealing section, which can be bent or curved with a fluid pressure, wherein at least one resilient frictional tooth is provided on or next to the surface of the sealing section at a distance from an edge of the sealing section, designed and arranged in such a way that it forms an angle between 30° and 150° with the sealing section and it tilts together (Continued)

with the bending or curving movement of the flat sealing section, wherein the frictional tooth has a contact surface on a side orientated in the tilting direction. The object of the disclosure is also achieved by a check valve for fluid technology outlet openings, comprising a housing part having a fluid outlet, wherein an above-mentioned sealing diaphragm is arranged in the flow path of the outlet opening, which is in contact with a sealing surface of a seal seat with a sealing section against the direction of flow and which can be bent or curved with a fluid pressure in the flow direction, wherein the contact surface of the at least one frictional tooth is simultaneously in contact with a corresponding bearing surface.

10 Claims, 4 Drawing Sheets

(58) Field of Classification Search
USPC .......................................................... 137/860
See application file for complete search history.

(56) References Cited

U.S. PATENT DOCUMENTS

| | | | |
|---|---|---|---|
| 5,613,615 A * | 3/1997 | Zeyfang | B65D 51/1661 220/203.11 |
| 6,237,621 B1 * | 5/2001 | Chaffee | F16K 15/1821 137/223 |
| 7,228,875 B2 * | 6/2007 | Stocchiero | F16K 15/142 137/860 |
| 9,046,182 B2 * | 6/2015 | Fukano | F16K 15/144 |
| 2007/0163656 A1 | 7/2007 | Mijers | |
| 2013/0186481 A1 | 7/2013 | Chaffee | |

FOREIGN PATENT DOCUMENTS

| | | |
|---|---|---|
| DE | 102 27 193 A1 | 1/2004 |
| DE | 10 2008 035 372 A1 | 2/2010 |
| DE | 10 2015 201 528 A1 | 8/2015 |
| DE | 11 2018 001 265 T5 | 11/2019 |
| JP | 2016-50613 A | 4/2016 |

* cited by examiner

SEALING DIAPHRAGM AND CHECK VALVE HAVING A SEALING DIAPHRAGM FOR FLUID TECHNOLOGY APPLICATIONS

This application is a 35 U.S.C. § 371 National Stage Application of PCT/DE2019/00309, filed on Dec. 2, 2019, which claims the benefit of priority to Serial No. DE 10 2018 009 963.7, filed on Dec. 21, 2018 in Germany, the disclosures of which are incorporated herein by reference in their entirety.

The disclosure relates to a sealing diaphragm and a check valve having a sealing diaphragm for fluid technology applications.

BACKGROUND

The use of check valves for simple control tasks is known in the prior art relating to fluid technology. In fluid technology applications, a check valve generally serves to determine the direction by allowing the flow of a fluid (liquid, gas) in only one direction. In this case, as a rule, a closing element is released in a passage direction by the pressure of the flowing fluid, while it automatically blocks in the opposite direction, owing, for example, to the restoring force of a spring, the force of gravity or a fluid pressure on the outflow side. The use of a sealing diaphragm means made from an elastically deformable material, such as an elastomer, as the closing element is furthermore known in this context. In this case, the diaphragm means can form, for example, a blocking flap which rests in a shape-elastic manner, with or without prestress, against a sealing surface in a flow path or is pressed into a sealing seat. If there is a sufficient fluid pressure in the passage direction to overcome the restoring force of the elastically deformable blocking flap, the blocking flap is lifted off the sealing seat and opens up the flow path. When the fluid pressure is removed, the blocking flap springs back into its initial position in a shape-elastic manner. In the opposite direction, the blocking flap blocks the flow path in a form-fitting manner by its sealing contact with the corresponding sealing surface or the sealing seat. In the field of pneumatics, for example, the use of such check valves with a sealing diaphragm for protecting outlet openings of valves or cylinders in order, depending on the operating environment, to prevent the penetration of dust, liquids or other substances, is known. In general, the fact that sealing diaphragms tend to vibrate, oscillate or flutter at certain fluid pressures, flow rates or actuating frequencies owing to their elasticity of shape is technically disadvantageous in the use of such sealing diaphragms for fluid technology applications. Particularly in pneumatic applications, this can lead to unwanted troublesome noises, such as a high whistling noise.

EP 0 624 744 A1 discloses a vibration-damped lip-shaped check valve for fluid technology applications. In order to prevent unwanted vibrations and whistling noises, it is proposed that the valve body formed from an elastomeric material comprises vibration dampers which oscillate freely in the flow path with a natural eigenfrequency that counteracts a vibrational movement of the valve body in a damping manner, for example by an antiphase vibration. The solution proposed by EP 0 624 744 A1 is relatively complicated in terms of design since the configuration of the vibration dampers must be specially calculated and matched to the respective nature and dimensioning of the valve body and the respective intended use in order to be able to fulfill the desired function. Furthermore, the technical solution requires the presence of certain spatial conditions to ensure that the additional vibration dampers can be positioned in a freely oscillating manner in the flow path.

DE 10 2009 018 930 A1 discloses a check valve having a flat blocking flap made of an elastically deformable material, in which a stop element is arranged on the side of the blocking flap facing the valve seat, against which stop element the blocking flap can strike in order to limit the extent to which the blocking flap is raised from the valve seat. The limited open position makes it possible to ensure that the fluid flows obliquely in a fluidically favorable manner against the blocking flap in its open position, as a result of which turbulence and fluidically unfavorable phenomena can be avoided. The solution proposed by DE 10 2009 018 930 A1 is disadvantageous insofar as, owing to the principle involved, the possible flow cross section is reduced because of the stop limitation. Moreover, stabilization of the blocking flap is achieved only in the complete open position at a certain minimum pressure. Finally, according to the solution disclosed by DE 10 2009 018 930 A1, the stop element must either be provided as a separate, additional component, or, according to an alternative embodiment, the valve is designed as a special double check valve, which is likewise complicated in design, in one piece with two blocking flaps and a common blocking element arranged between them.

SUMMARY

The object underlying the disclosure is that of avoiding the disadvantages explained. In particular, the object is to provide a sealing diaphragm which can be produced in a low-cost and structurally simple manner for fluid technology applications, which can be used as a closing means for a check valve and by means of which unwanted troublesome noises are avoided during operation.

According to the disclosure, the object is achieved by a sealing diaphragm as claimed in claim 1 and a check valve having a sealing diaphragm as claimed in claim 5. Advantageous developments of the disclosure are specified in the dependent claims.

The core of the disclosure is formed by a sealing diaphragm having a flat, flexurally elastic sealing section, which can be bent or bowed with a fluid pressure, in which at least one shape-elastic friction tooth is formed or arranged in such a way on or next to the surface of the sealing section, at a distance from an edge of the sealing section, that it forms an angle of from 30° to 150° with the sealing section and tilts together with the bending or bowing movement of the flat sealing section, wherein the friction tooth has a contact surface on a side oriented in the tilting direction. The flat sealing section of the sealing diaphragm serves as a closing element in that, in its rest position, it can be brought, with or without prestress, by contact in a sealing seat having a corresponding sealing surface or a sealing seat. With a sufficient fluid pressure directed against the contact of the sealing section with the corresponding sealing surface or the sealing seat, the shape-elastic restoring force of the sealing section can be overcome, causing the sealing section to bend or bow and enabling a flow cross section to be opened up. With the bending or bowing movement of the flat sealing section, the shape-elastic friction tooth tilts at the same time, as a result of which the contact surface of the friction tooth located on a side oriented in the tilting direction can be brought into contact with a corresponding stop surface of the environment. In this case, the contact surface of the friction tooth exerts a frictional engagement on the corresponding stop surface, as a result of which the position of the sealing section is stabilized in its open position on account of the physical connection of the sealing section and the friction tooth, and unwanted vibration, oscillation or fluttering of the sealing section in the open position is prevented or at least greatly damped. As a result, unwanted troublesome noises are avoided. The width and length of the friction tooth, the angle which the friction tooth forms with the sealing section, and the distance of the friction tooth from the edge of the sealing section are selected as a function of the given geometry of the operating environment, the fluid pressure and the elasticity of shape of the material used in such a way that, in the open position of the sealing section, sufficient throughflow is obtained and, at the same time, sufficient stabilization of the position of the sealing section is obtained. In an embodiment of simple design, one or more friction teeth is or are formed or arranged, for example, at a distance from the edge of the sealing section, perpendicularly to the latter. With the bending or bowing of the sealing section when loaded with a fluid pressure, each friction tooth tilts at the same time and, from a specific opening angle of the sealing section, engages with its contact surface, e.g. on the inner side of a fluid channel, as a result of which, depending on the length of the friction tooth, frictional engagement with the inner side can be produced from a specific bending or bowing angle, stabilizing the sealing section. Owing to the elasticity of shape of the friction tooth, dynamic stabilization of the sealing section is made possible here over a larger bending or bowing range. The sealing diaphragm according to the disclosure has the further advantage that, overall, it can be produced both at low cost and in a structurally simple manner in one piece. In particular, the sealing diaphragm can be produced in a simple manner with one or more friction teeth as an elastomer in a single primary forming or forming production step.

In the case of a sealing diaphragm having an edge region and a central region, at least one sealing section is preferably provided in the edge region, or the edge region is formed continuously as a sealing section. As a result, the sealing diaphragm can be fixed in the central region, while the sealing section formed in the edge region assumes the valve function.

If the edge region is formed continuously as a sealing section, a plurality of friction teeth is in each case preferably formed or arranged at the same distance from the edge of the sealing section over the entire sealing section and in each case at a distance from one another. This ensures a uniform bending or bowing moment of the encircling sealing section over its entire surface and thus a uniform sealing effect.

If the friction teeth are in each case formed or arranged at an equal distance from one another, uniform stabilization of the sealing section is achieved over its entire surface. If the friction teeth are formed or arranged at a varying distance from one another, further influence is obtained over the vibration behavior of the sealing diaphragm. By means of a slight variation in the distance of the friction teeth from one another, an additional moment of influence on the vibration behavior of the sealing diaphragm is created, as a result of which the build-up of unwanted periodic vibration processes can additionally be avoided.

In a further refinement of the disclosure, a sealing diaphragm has a continuous encircling sealing section in the edge region, a circular base surface, and friction teeth designed or arranged in an annular manner. As a result, the sealing diaphragm can be used in a structurally simple manner to protect typical outlet openings, for example those of pneumatic valves or cylinders, which as a rule likewise have a circular cross section as outlets of fluid channels.

In a further refinement of the above-described embodiment of the disclosure, at least one throughflow opening is formed in the central region, and a clamping or flange surface or a hollow projection is formed running around the throughflow opening. As a result, the sealing diaphragm can be placed in a simple manner in the central region above a fluid outlet and can be fixed with a covering cap from the outside, for example. Flow can take place through the at least one throughflow opening in the central region and can be deflected by the covering cap onto the edge region of the sealing diaphragm, which performs the valve function.

A check valve according to the disclosure for outlet openings used in fluid engineering comprises a housing part having a fluid outlet, wherein a sealing diaphragm in accordance with one of the above-described embodiments is arranged in the flow path of the outlet opening, which diaphragm rests by means of a sealing section against a sealing surface of a sealing seat against the direction of flow and which diaphragm can be bent or bowed with a fluid pressure in the flow direction, wherein the contact surface of the at least one friction tooth simultaneously comes to bear against a bearing surface corresponding to said contact surface.

In a further refinement of the above-described embodiment of the check valve, which can be produced in a structurally simple manner, said valve is formed with a sealing diaphragm having an edge region and a central region and a circular base surface, wherein the edge region is formed continuously as a sealing section and a plurality of friction teeth is in each case formed or arranged overall in an annular manner on the surface of the sealing section, at the same distance from the edge of the sealing section, over the entire sealing section and in each case at a distance from one another. The sealing diaphragm is furthermore formed simultaneously with a central throughflow opening, around which a hollow projection is formed. The fluid outlet is formed with a corresponding hollow projection, and the sealing diaphragm can be plugged onto the latter or inserted into the latter. A circular, cross-sectionally hat-shaped covering cap can be fixed on that side of the sealing diaphragm which faces away from the fluid outlet, wherein an encircling flank of the head part of the covering cap fits around the circumference of the friction teeth formed or arranged in an annular manner, and an encircling inner rim section of the covering cap forms a sealing seat having a sealing surface in that it is designed in such a way as to be inclined relative to the plane of the sealing section in the direction of the housing, with the result that the edge-side sealing section rests flush, under prestress, in a slight bending or bowing position against the inner rim section, wherein the covering cap forms a further, outer rim section, which surrounds the inner rim section and which is formed from a toothed profile or is configured as a continuous collar having through openings and by means of which the covering cap can be fixed on or in the housing, wherein a cavity is formed below the edge-side sealing section, into which cavity the latter can engage under fluid pressure in a bending or bowing movement, wherein the friction teeth tilt and come to bear with their contact surface against the inner side, forming the bearing surface, of the encircling flank of the head part of the covering cap. When the fluid outlet is supplied, the flow passes through the central throughflow opening of the sealing diaphragm, and the fluid flow is deflected by the covering cap on that side of the sealing diaphragm which faces away from the fluid outlet onto the edge region of the sealing diaphragm, which is formed continuously as a sealing section. When a sufficient fluid pressure is applied, the shape-elastic restoring force of the sealing section is overcome, as a result of which the sealing section rises in a bending or bowing movement from the inner rim section forming the sealing seat with a sealing surface, wherein it engages in the cavity and opens up a flow cross section for the fluid flow. The fluid flow can escape into the atmosphere through the exposed flow cross section, the cavity and the openings of the outer rim section which are formed by a toothed profile or as through openings of a collar. With the bending or bowing of the sealing section, the friction teeth tilt at the same time and simultaneously come to bear with their contact surfaces respectively oriented in the tilting direction against the inner side, forming the bearing surface, of the encircling flank of the head part of the covering cap and exert a frictional engagement therewith, as a result of which the position of the sealing section is stabilized in its open position on account of the physical connection of the sealing section and the friction tooth, and unwanted vibration, oscillation or fluttering of the sealing section in the open position is prevented or at least damped to such an extent that no unwanted troublesome noises are emitted.

In a further refinement of the above-described embodiment of the check valve, the sealing diaphragm has a plurality of stabilizing teeth formed or arranged in an annular manner around the hollow projection in the central region. These serve to additionally stabilize the sealing diaphragm in the central region by preventing or limiting any lifting movement with respect to the roof of the head part of the covering cap. For this purpose, the length of the stabilizing teeth is preferably selected in such a way that form-fitting engagement with the roof can be produced. In this case, fluid flow is made possible through the gaps between the stabilizing teeth.

BRIEF DESCRIPTION OF THE DRAWINGS

Further advantages of the disclosure are illustrated in greater detail below by means of the figures, together with the description of preferred exemplary embodiments of the disclosure. In the figures.

DETAILED DESCRIPTION

Figure 1:
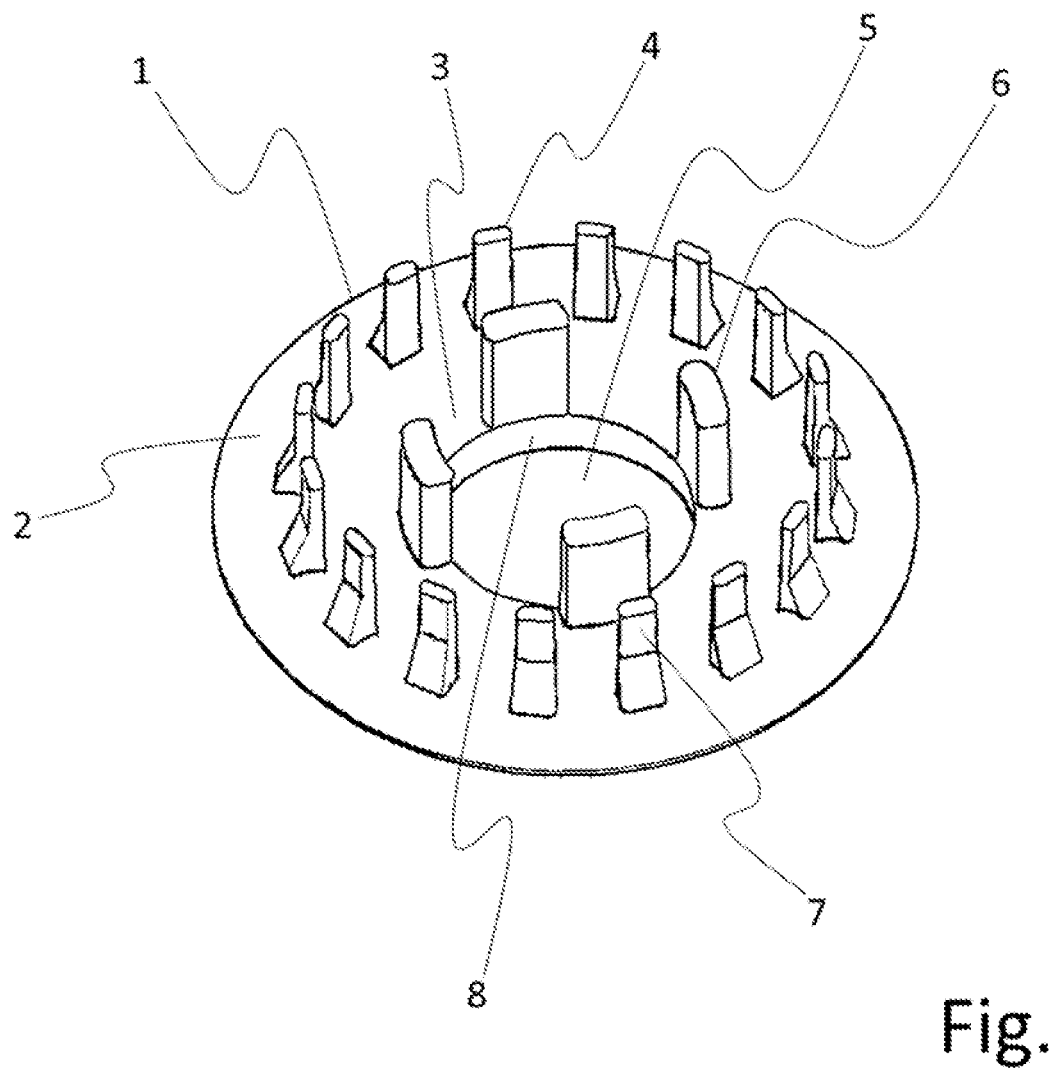
FIG. 1 shows a perspective view of a sealing diaphragm.

FIG. 1 shows the sealing diaphragm 1 in a perspective illustration. The sealing diaphragm 1 is formed from a shape-elastic elastomer and has a circular base with an outer encircling edge region 2 and an inner central region 3. The edge region 2 forms a continuous sealing section. Immediately adjacent to the surface of the sealing section formed by the edge region 2, a plurality of friction teeth 4 is arranged in an annular manner perpendicularly to the base surface of the sealing diaphragm 1 (and thus simultaneously perpendicularly to the plane of the sealing section formed by the edge region 2), of which only friction tooth 4 is numbered by way of example in FIG. 1 for the sake of greater clarity. Here, the friction teeth 4 are in each case arranged at an equal distance from the outer edge of the edge region 2 forming the sealing section and at an equal distance from one another. Alternatively, the friction teeth 4 can also be arranged at a slightly varying distance from one another (not shown in FIG. 1), with the distance from the outer edge being the same in each case, as a result of which, if necessary, there is an additional moment of influence on the vibration behavior of the sealing diaphragm 1. A central throughflow opening 5 is formed in the central region 3. A plurality of stabilizing teeth is arranged in an annular manner around the throughflow opening 5, of which only stabilizing tooth 6 is numbered by way of example in FIG. 1 for the sake of clarity. On their flank oriented toward the outer edge, forming the sealing section, of the edge region 2, the friction teeth 4 in each case have a contact surface 7, of which, for the sake of clarity, only contact surface 7 is numbered by way of example in FIG. 1. The hollow projection 8 is designed to extend around the central throughflow opening 5.

Figure 2:
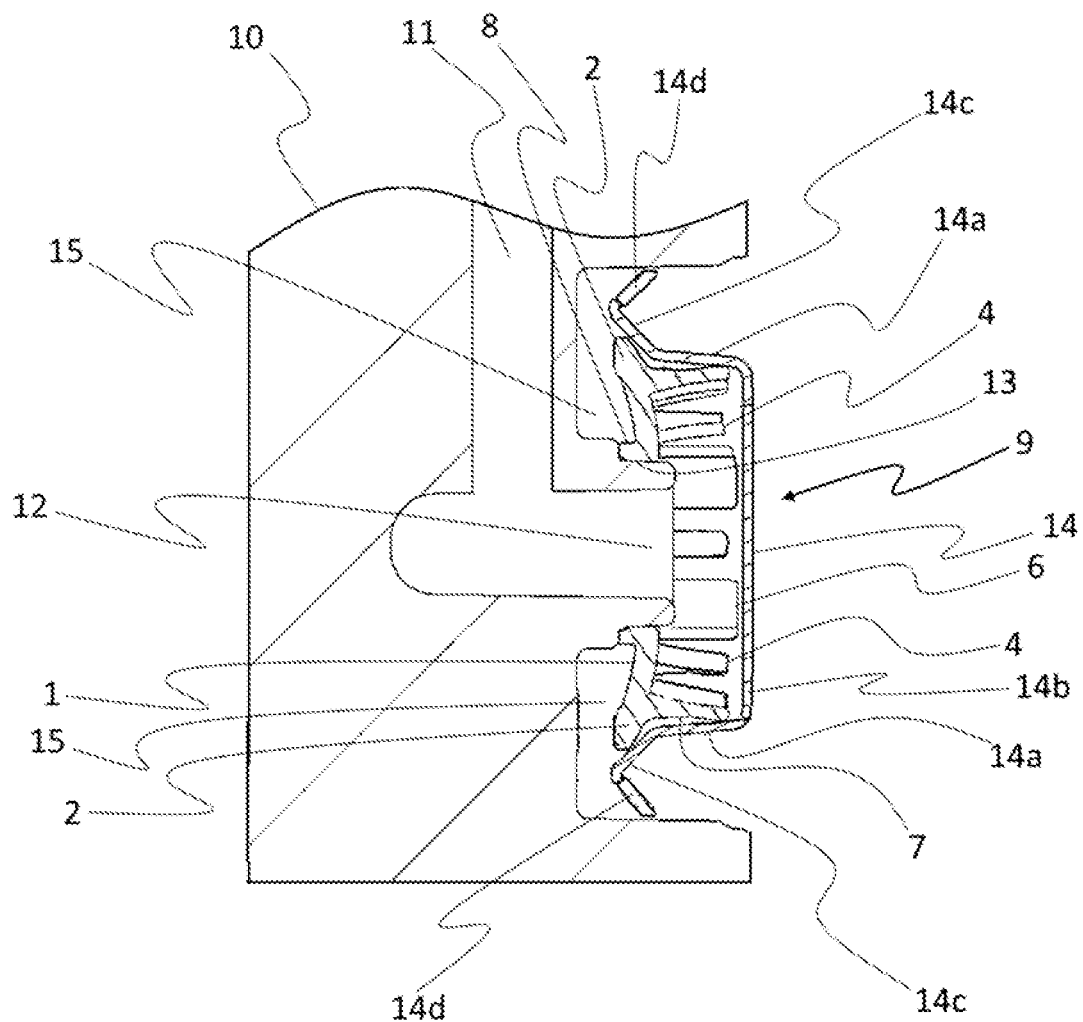
FIG. 2 shows a sectional illustration of a check valve having the sealing diaphragm according to FIG. 1 in the rest position.
Figure 3:
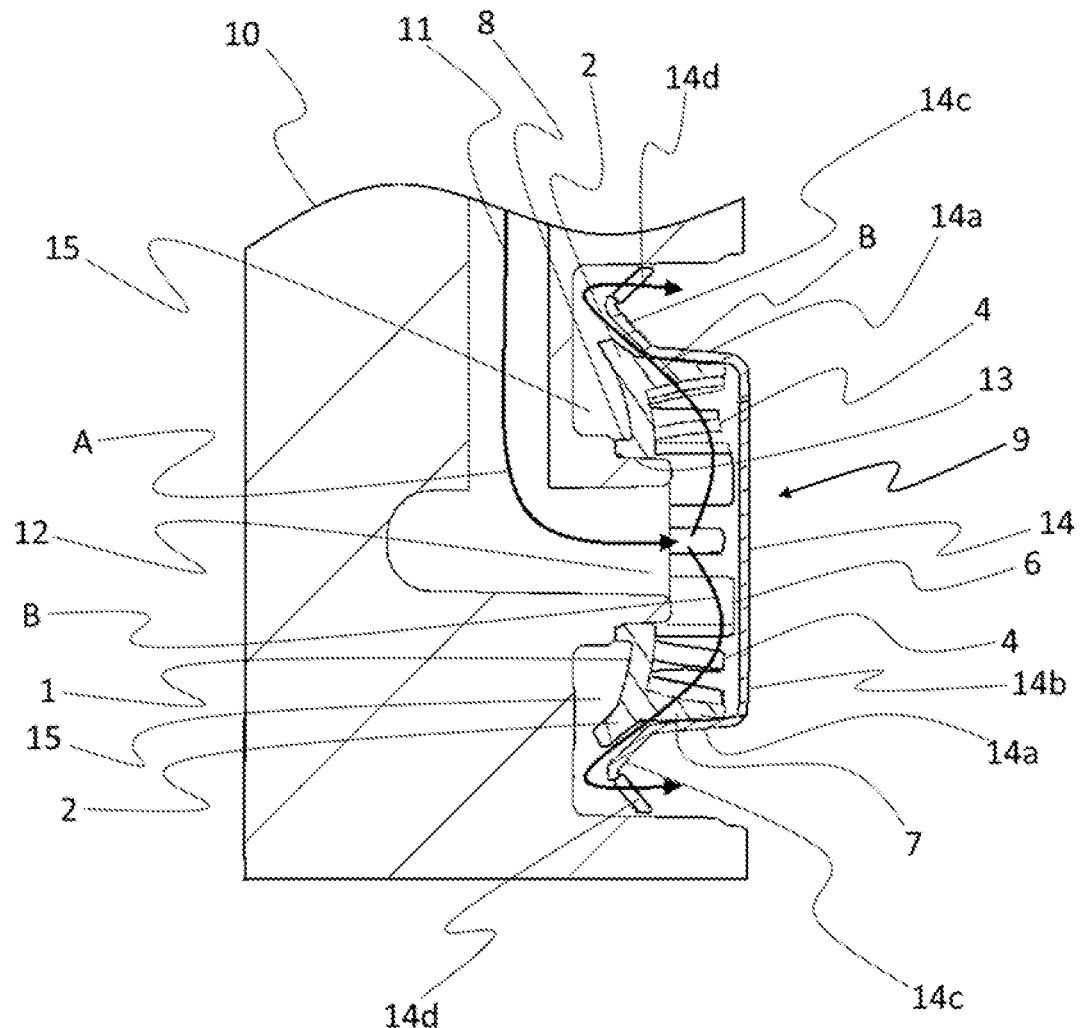
FIG. 3 shows a sectional illustration of the check valve according to FIG. 2 in the actuation position with a schematic illustration of the flow path of the fluid flow.
Figure 4:
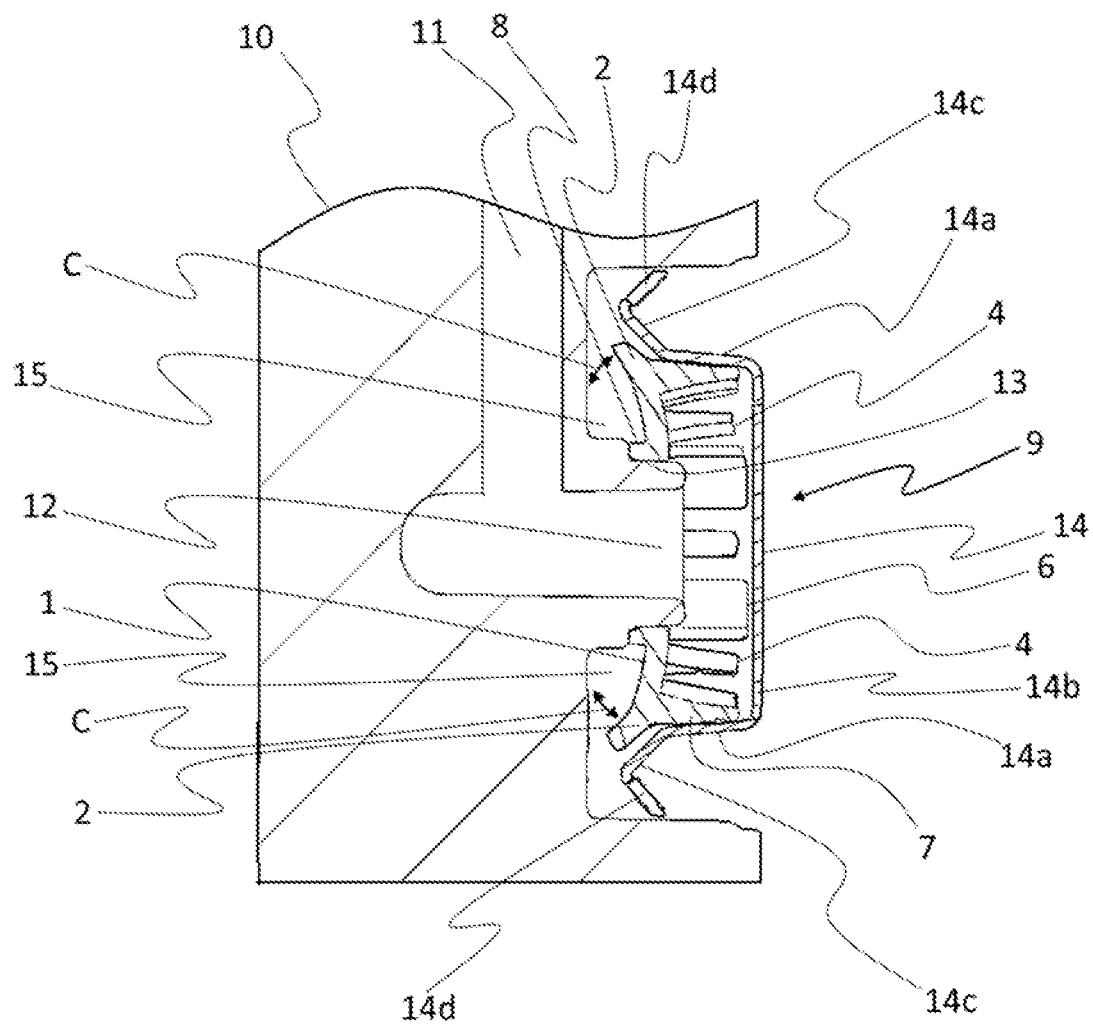
FIG. 4 shows a sectional illustration of the check valve according to FIG. 2 in the actuation position with a schematic illustration of the bowing of the sealing section.

FIGS. 2 to 4 show the check valve 9 with the sealing diaphragm 1 according to FIG. 1 in the installed position. Formed in the housing part 10 of a pneumatic valve housing is the fluid channel 11, which ends with a cylindrical opening as a fluid outlet 12. On its outside, the fluid outlet 12 is formed with a hollow projection 13 corresponding to the hollow projection 8 of the sealing diaphragm 1. The sealing diaphragm 1 is placed with the hollow projection 8 on the hollow projection 13. Arranged on the side of the sealing diaphragm 1 which faces away from the fluid outlet 12 is the covering cap 14, which has a circular basic shape (not recognizable in the illustrations in FIGS. 2 to 4 owing to the perspective). In cross section, the covering cap 14 has a hat shape, with a head part formed by the encircling flank 14a and the roof 14b, an encircling inner rim section 14c and an outer rim section 14d surrounding the inner rim section 14c. With the encircling flank 14a, the covering cap 14 fits around the friction teeth 4 of the sealing diaphragm 1 at the circumference (in FIGS. 2 to 4, for the sake of greater clarity, only the two friction teeth 4 are numbered by way of example). In this case, the sealing diaphragm 1 is fixed in the central region 3 with the stabilizing teeth (in the illustrations in FIGS. 2 to 4, only stabilizing tooth 6 is numbered by way of example for the sake of clarity) in a form-fitting manner with respect to the roof 14b of the covering cap 14. The outer rim section 14d is formed from a toothed profile with gaps, although this is not apparent in the illustrations in FIGS. 2 to 4 owing to the perspective. By means of the outer rim section 14d, the covering cap 14 is simultaneously fixed in a force-fitting and form-fitting manner in a cylindrical recess of the housing part 10 running around the fluid outlet 12, in that it is pressed into the latter.

FIG. 2 illustrates the sealing diaphragm 1 in its rest position, in which the fluid outlet 12 is not supplied. In this case, the sealing diaphragm 1 rests sealingly by means of the edge region 2 forming the sealing section against the inner side of the inner rim section 14c of the covering cap 14. Here, the inner side of the inner rim section 14c functions simultaneously as a sealing surface and sealing seat for the sealing section of the sealing diaphragm 1. Below the edge region 2 of the sealing diaphragm 1, the cylindrical recess of the housing part 10 running around the fluid outlet 12 forms a cavity 15.

FIGS. 3 and 4 show the sealing diaphragm 1 in its open position, which it assumes when the fluid outlet 12 is supplied with a sufficient pressure. The flow path of the fluid is illustrated in FIG. 3 by arrows A and B. When the fluid outlet 12 is supplied, the flow passes through the central throughflow opening 5 of the sealing diaphragm 1 (arrow A), and the fluid flow is deflected by the covering cap 14 on that side of the sealing diaphragm 1 which faces away from the fluid outlet 12 onto the encircling edge region 2 of the sealing diaphragm 1 (arrows B), which is formed continuously as a sealing section. During this process, the fluid flow passes through the gaps between stabilizing teeth 6. When a sufficient fluid pressure is applied, the shape-elastic restoring force of the edge region 2 of the sealing diaphragm 1 which forms the sealing section is overcome, as a result of which the edge region 2 rises in a bowing movement from the inner side of the inner rim section 14c of the covering cap 14, wherein it engages in the cavity 15 and opens up a flow cross section for the fluid flow. The fluid flow escapes from the cavity into the atmosphere through the exposed flow cross section, passing through the gaps between the toothed profile formed by the outer rim section 14d. The direction of the bowing movement of the edge region 2 of the sealing diaphragm 1 forming the sealing section is illustrated in FIG. 4 by the arrows C. With the bowing of the edge region 2, the friction teeth 4 simultaneously tilt and, in the process, come to bear with their contact surfaces 7 respectively oriented in the tilting direction against an inner side, forming a bearing surface, of the encircling flank 14a of the covering cap 14 and exert a frictional engagement thereon. As a result, the position of the edge region 2 of the sealing diaphragm 1 forming the sealing section is stabilized in its open position on account of the physical connection of the edge region 2 and the friction teeth 4, and unwanted vibration, oscillation or fluttering of the sealing section in the open position is prevented or at least damped to such an extent that no unwanted troublesome noises are emitted.

The check valve 9 can be produced in a structurally particularly simple and low-cost manner since, in addition to the housing part 10 with corresponding bores, it is formed only from the sealing diaphragm 1 and the covering cap 14. In this case, the sealing diaphragm 1 can be produced simply as an elastomer part in a primary forming or forming production process. The covering cap 14 can simply be produced as a metal part in a punching process or as a plastic part in an injection molding process.

LIST OF REFERENCE SIGNS 1 sealing diaphragm
2 edge region
3 central region
4 friction tooth
5 throughflow opening
6 stabilizing tooth
7 contact surface
8, 13 hollow projection
9 check valve
10 housing part
11 fluid channel
12 fluid outlet
14 covering cap
14a flank
14b roof
14c inner rim section
14d outer rim section
15 cavity

The invention claimed is:

1. A sealing diaphragm comprising:
an edge region continuously formed as a flat, flexurally elastic sealing section, which can be bent or bowed with a fluid pressure;
a central region; and
a plurality of friction teeth formed or arranged on or next to a surface of the sealing section,
wherein the friction teeth in each case include a flank and a contact surface on the flank, the contact surface oriented toward an outer edge of the sealing section,
wherein an angle is defined between the surface of the sealing section and the contact surface of each friction tooth, the angle is from 30° to 150°,
wherein the friction teeth in each case are located at a distance from the outer edge of the sealing section,
wherein the sealing diaphragm is formed in one piece together with the edge region, the central region, and the plurality of friction teeth,
wherein at least one throughflow opening is formed in the central region, and
wherein a clamping or flange surface or a hollow projection is formed running around the throughflow opening.

2. The sealing diaphragm as claimed in claim 1, wherein:
the friction teeth are in each case formed or arranged at the same distance from the outer edge of the sealing section over the entire sealing section, and
the friction teeth are in each case formed or arranged at another distance from one another.

3. The sealing diaphragm as claimed in claim 2, wherein the friction teeth are in each case formed or arranged at an equal or varying distance from one another.

4. The sealing diaphragm as claimed in claim 1, further comprising:
a circular base surface,
wherein the friction teeth of the plurality of friction teeth are formed or arranged in an annular manner.

5. The sealing diaphragm as claimed in claim 1, wherein the sealing diaphragm is formed in one piece together with the clamping or flange surface or the hollow projection.

6. The sealing diaphragm as claimed in claim 1, wherein the sealing diaphragm is formed from an elastomer.

7. A check valve for an outlet opening used in fluid engineering, comprising:
a housing part having a fluid outlet; and
a sealing diaphragm comprising a flat, flexurally elastic sealing section, which can be bent or bowed with a fluid pressure in a tilting direction,
wherein at least one friction tooth is formed or arranged in such a way on or next to the surface of the sealing section, at a distance from an edge of the sealing section, that the at least one friction tooth forms an angle of from 30° to 150° with the sealing section and tilts together with the bending or bowing movement of the sealing section,
wherein the at least one friction tooth has a contact surface on a side oriented in the tilting direction,
wherein the sealing diaphragm is arranged in a flow path of the outlet opening, the flow path defining a flow direction,
wherein the sealing section of the sealing diaphragm rests against a sealing surface of a sealing seat against the flow direction,
wherein the sealing section of the sealing diaphragm can be bent or bowed with a fluid pressure in the flow direction, and
wherein the contact surface of the at least one friction tooth simultaneously comes to bear against a bearing surface corresponding to the contact surface.

8. The check valve as claimed in claim 7, wherein:
at least one throughflow opening is formed in a central region of the sealing diaphragm, and a clamping or flange surface or a hollow projection is formed running around the throughflow opening, the fluid outlet is formed with a corresponding hollow projection, and the sealing diaphragm can be plugged onto the hollow projection or can be plugged into the hollow projection, and a circular, cross-sectionally hat-shaped covering cap can be fixed on a side of the sealing diaphragm which faces away from the fluid outlet, the at least one friction tooth include a plurality of the friction teeth formed or arranged in an annular manner, an encircling flank of a head part of the covering cap fits around a circumference of the friction teeth, and an encircling inner rim section of the covering cap forms a sealing seat having a sealing surface configured to be inclined relative to a plane of the sealing section in a direction of the housing part, such that a portion of the sealing section rests flush, under prestress, in a slight bending or bowing position against the encircling inner rim section, an outer rim section of the covering cap surrounds the encircling inner rim section and is formed from a toothed profile or is configured as a continuous collar having through openings and configures the covering cap to be fixed on or in the housing part, a cavity is formed below the sealing section, the sealing section is configured to engage into the cavity under fluid pressure in the bending or bowing movement, and wherein the plurality of friction teeth tilt and come to bear the contact surfaces against an inner side, forming the bearing surface, of the encircling flank of the head part of the covering cap.

9. The check valve as claimed in claim 8, wherein the sealing diaphragm has a plurality of stabilizing teeth formed or arranged in an annular manner around the hollow projection in the central region.

10. The check valve as claimed in claim 9, wherein the sealing diaphragm is formed in one piece together with the plurality of stabilizing teeth.

* * * * *